(12) United States Patent
Ali et al.

(10) Patent No.: US 9,026,803 B2
(45) Date of Patent: May 5, 2015

(54) COMPUTING ENTITIES, PLATFORMS AND METHODS OPERABLE TO PERFORM OPERATIONS SELECTIVELY USING DIFFERENT CRYPTOGRAPHIC ALGORITHMS

(75) Inventors: Valiuddin Y. Ali, Cypress, TX (US); Graeme John Proudler, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 1014 days.

(21) Appl. No.: 12/627,500

(22) Filed: Nov. 30, 2009

(65) Prior Publication Data

US 2011/0131420 A1 Jun. 2, 2011

(51) Int. Cl.
| | |
|---|---|
| *G06F 21/00* | (2013.01) |
| *G06F 21/57* | (2013.01) |
| *G06F 21/74* | (2013.01) |
| *H04L 9/06* | (2006.01) |
| *H04L 9/14* | (2006.01) |

(52) U.S. Cl.
CPC .............. *G06F 21/575* (2013.01); *G06F 21/74* (2013.01); *H04L 9/0637* (2013.01); *H04L 9/14* (2013.01); *H04L 2209/127* (2013.01)

(58) Field of Classification Search
CPC .. G06F 21/575; G06F 21/74; H04L 2209/127
USPC ........................................................ 713/189
See application file for complete search history.

(56) References Cited

U.S. PATENT DOCUMENTS

| | | | | |
|---|---|---|---|---|
| 6,490,353 | B1* | 12/2002 | Tan ................................ | 380/37 |
| 6,971,022 | B1* | 11/2005 | Katta et al. .................... | 713/193 |
| 7,106,845 | B1* | 9/2006 | Zhuk et al. ............... | 379/207.11 |
| 7,266,200 | B2* | 9/2007 | Lambert ........................ | 380/263 |
| 2001/0025340 | A1* | 9/2001 | Marchant ...................... | 713/150 |
| 2001/0037457 | A1* | 11/2001 | Inada ............................. | 713/189 |
| 2002/0044657 | A1* | 4/2002 | Asano et al. .................. | 380/201 |
| 2004/0139339 | A1* | 7/2004 | Yeh et al. ...................... | 713/193 |
| 2004/0260910 | A1* | 12/2004 | Watt et al. ....................... | 712/43 |
| 2005/0039013 | A1* | 2/2005 | Bajikar et al. ................ | 713/172 |
| 2005/0078828 | A1* | 4/2005 | Zheng ........................... | 380/270 |
| 2005/0132186 | A1* | 6/2005 | Khan et al. .................... | 713/165 |
| 2005/0223221 | A1 | 10/2005 | Proudler et al. | |
| 2005/0240998 | A1* | 10/2005 | Cromer et al. .................. | 726/22 |
| 2006/0075312 | A1* | 4/2006 | Fischer et al. .................. | 714/48 |
| 2006/0256963 | A1* | 11/2006 | Gebotys ........................ | 380/205 |
| 2007/0154018 | A1* | 7/2007 | Watanabe ..................... | 380/273 |
| 2007/0168048 | A1* | 7/2007 | Allen et al. ....................... | 700/2 |
| 2008/0130895 | A1* | 6/2008 | Jueneman et al. ............ | 380/277 |
| 2008/0235381 | A1* | 9/2008 | Tanizawa et al. ............. | 709/227 |
| 2008/0282348 | A1* | 11/2008 | Proudler et al. ................ | 726/22 |
| 2010/0023781 | A1* | 1/2010 | Nakamoto .................... | 713/193 |

OTHER PUBLICATIONS

Jung et al., Suitability of Cryptographic Modes of Operation for the Encryption in High-speed Networks, Oct. 2001, Proceedings of the Ninth IEEE International Conference on Networks, pp. 134-139.*

\* cited by examiner

*Primary Examiner* — Taghi Arani
*Assistant Examiner* — Kenneth Chang
(74) *Attorney, Agent, or Firm* — Mannava & Kang. P.C.

(57) ABSTRACT

Described herein is a computing platform incorporating a trusted entity, which is controllable to perform cryptographic operations using selected ones of a plurality of cryptographic algorithms and associated parameters, the entity being programmed to record mode of operation information, which is characterized by the algorithms and associated parameters that are selected to perform an operation.

16 Claims, 10 Drawing Sheets

| Mode Name 812 | TCG Mode? 814 | Algorithm A 816 | Algorithm B 816 | Algorithm C 816 | Algorithm D 816 |
|---|---|---|---|---|---|
| Mode1 (hashID) | Y | Algorithm1 818 / Parameters1 820 | Name1 (hashID) 822 / Algorithm2 / Parameters2 | Name2 (hashID) / Algorithm3 / Parameters3 | Name3 (hashID) / Algorithm4 / Parameters4 | Name4 (hashID) |
| Mode2 (hashID) | Y | Algorithm1 / Parameters1 | Name1 (hashID) / Algorithm5 / Parameters5 | Name5 (hashID) / Algorithm6 / Parameters6 | Name6 (hashID) / Algorithm7 / Parameters7 | Name7 (hashID) |
| Mode3 (hashID) | N | Algorithm1 / Parameters12 | Name12 (hashID) / Algorithm2 / Parameters22 | Name22 (hashID) / Algorithm8 / Parameters8 | Name8 (hashID) / Algorithm9 / Parameters9 | Name9 (hashID) |
| | | | | | | |
| ModeN (hashID) | N | AlgorithmW / ParametersW | NameW (hashID) / AlgorithmX / ParametersX | NameX (hashID) / AlgorithmY / ParametersY | NameY (hashID) / AlgorithmZ / ParametersZ | NameZ (hashID) |

Figure 8

COMPUTING ENTITIES, PLATFORMS AND METHODS OPERABLE TO PERFORM OPERATIONS SELECTIVELY USING DIFFERENT CRYPTOGRAPHIC ALGORITHMS

FIELD

The present invention relates to computing entities, and associated methods, that can selectively use different cryptographic algorithms.

BACKGROUND

In trusted computing systems, in order to assure appropriate trust and/or security, it is possible for software to check every parameter of every cryptographic key that the software uses, before the software uses it. This can be automated but is inconvenient for software developers and typically requires the developers to have a detailed understanding of what makes a cryptographic key safe or unsafe. While it is desirable for software developers to have such detailed understanding, it may not always be a practical expectation, and there remains a need for convenient ways to instill confidence that the operation of a computing system, in terms of the cryptographic keys it uses, is trustworthy.

Some trusted computing systems contain a component, known as a Trusted Platform Module (TPM), which is at least logically protected from subversion. Such components have been developed by the companies forming the Trusted Computing Group (TCG). The TCG develops specifications in this area, for example the "TCG TPM Specification" Version 1.2, which is published on the TCG website https://www.trustedcomputinggroup.org/. The implicitly trusted components of a trusted computing system enable measurements of the trusted computing system and are then able to provide these in the form of integrity metrics to appropriate entities wishing to interact with the trusted computing system. The receiving entities are then able to determine from the consistency of the measured integrity metrics with known or expected values that the trusted computing system is operating as expected. In some such trusted computing systems, the parameters and associated algorithms employed by the trusted components are relatively standard, and well understood, which, to a large degree, obviates the requirement to check every parameter of every cryptographic key that software uses. However, future TCG TPM Specifications may provide the capability for different manufacturers or owners or users to load different algorithms and different parameters settings for the same algorithms into a trusted component. Then, different trusted components might use different algorithms and/or different algorithm parameters, possibly interchangeably on demand, to enact particular cryptographic operations, such as encryption or decryption. Such a development would once again place greater onus on software developers to have a detailed understanding of what makes a cryptographic key safe or unsafe.

SUMMARY

According to a first aspect, the present invention provides a computing platform incorporating a trusted entity, which is controllable to perform cryptographic operations using selected ones of a plurality of cryptographic algorithms and associated parameters, the entity being programmed to record mode of operation information, which is characterised by the algorithms and associated parameters that are selected to perform an operation.

According to a second aspect, the present invention provides a hardware trusted component arranged to store a plurality of cryptographic algorithms and associated parameters and being programmed to record mode of operation information, which is characterised by the algorithms and associated parameters that are selected to perform an operation.

According to a third aspect, the present invention provides a computer program product comprising instructions recorded thereon to perform cryptographic operations using selected ones of a plurality of cryptographic algorithms and associated parameters and to record mode of operation information, which is characterised by the algorithms and associated parameters that are selected to perform an operation.

According to a fourth aspect, the present invention provides a method of operating a computing platform incorporating a trusted entity, which is controllable to perform cryptographic operations using selected ones of a plurality of cryptographic algorithms and associated parameters, including the step of recording mode of operation information, which is characterised by the algorithms and associated parameters that are selected to perform an operation.

BRIEF DESCRIPTION OF THE DRAWINGS

Embodiments of the invention will now be described, by way of non-limiting example, with reference to the accompanying diagrammatic drawings of the prior art and of embodiments of the invention, in which:

FIG. 8 is an illustration of a mode table of a trusted entity according to an embodiment of the present invention;

DETAILED DESCRIPTION

Figure 1:
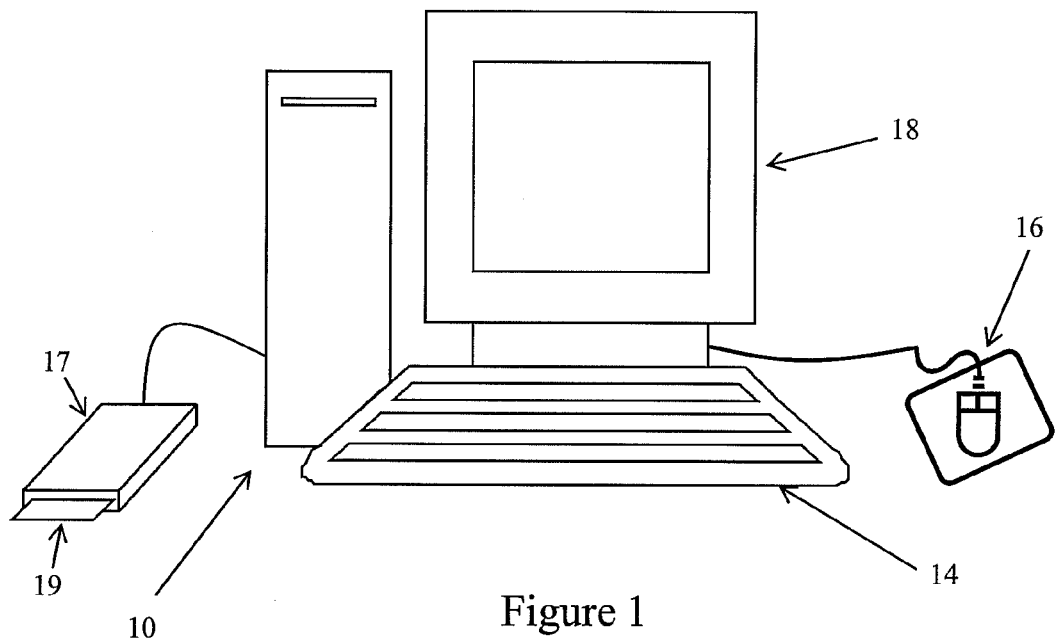
FIG. 1 is an illustration of an exemplary prior-art computing platform.

Various embodiments of the present invention will now be described in more detail with reference to the accompanying drawings. It will be appreciated that the invention is not limited in its application to the details of method and the arrangement of components as set forth in the following description or illustrated in the drawings. It will be apparent to a person skilled in the art that additional embodiments of the present invention not detailed in the description are possible and will fall within the scope of the present claims. Accordingly, the following description should not be interpreted as limiting in any way, and the scope of protection is defined solely by the claims appended hereto.

Before describing embodiments of the present invention, two prior-art trusted computing platforms will be described with reference to FIGS. 1 to 8 to introduce certain terms and concepts later used in describing the embodiments of the invention. The specifics of the described prior-art trusted computing platforms (starting with the next paragraph) are not intended to limit the scope of the present invention unless otherwise stated. As used herein, the term "computing platform" is to be understood as encompassing any apparatus capable of effecting computation and is not limited to computers; for example, digital cellular equipment (including mobile telephones) and personal digital assistants (PDAs) have substantial computing capability and are within the scope of the term "computing platform". In addition, the term computing platform herein includes, except where the context otherwise requires, a virtual computing platform environment, which is substantially independent (e.g. encapsulated or compartmentalised) of other such computing environments, which all reside on a common physical computing platform (an example of such an environment is given hereinafter).

Furthermore, in the present context "trust" is the expectation that a device will behave in a particular manner for a specific purpose; and. a "user" can be a local user or a remote user such as a remote computing entity.

General Characteristics of a Prior-Art Trusted Platform

A trusted computing platform provides for trustable platform integrity measurement and reporting and to this end has a plurality of shielded locations, that is, places (memory, registers, etc.) where it is safe to operate on sensitive data. Integrity measurement is the process of obtaining integrity metric measurements of a platform (that is, measurements of platform characteristics that affect the integrity—trustworthiness—of the platform) and putting the measurements (here taken to encompass derivative values such as digests) into shielded locations; in TCG parlance, the shielded locations used for storing integrity metrics are referred to as Platform Configuration Registers or "PCRs" and this terminology will be used hereinafter. The values held in the PCRs are reportable integrity metric values. Integrity reporting is the process of attesting to integrity metrics recorded in PCRs in a way that associates the metrics with the platform concerned. A trusted computing platform may also provide, in addition to shielded locations, trustable storage for securely storing data in encrypted form and for ensuring that access to this data only occurs in a named environment. The foregoing trusted features will normally involve the use of cryptographic functions.

A user can verify the correct operation of a trusted computing platform, for example, before exchanging data with the platform, by requesting the trusted platform to provide one or more integrity metrics. The user receives the integrity metric or metrics, and compares them against values which it believes to be true (these values being provided by a trusted party, TP that is prepared to vouch for the trustworthiness of the platform or by another party the user is willing to trust). If there is a match, the implication is that at least part of the platform is operating correctly, depending on the scope of the integrity metric. If there is no match, the assumption is that the entire platform has been subverted and cannot be trusted (unless isolation technologies are employed to restrict the scope of what cannot be trusted).

Once a user has established trusted operation of the platform, he exchanges data with the platform. For a local user, the exchange might be by interacting with some software application running on the platform. For a remote user, the exchange might involve a secure transaction. In either case, the data exchanged is preferably 'signed' by the trusted platform. The user can then have greater confidence that data is being exchanged with a platform whose behaviour can be trusted. Data exchanged may be information relating to some or all of the software running on the computer platform.

Trusted Entity Providing for Roots of Trust

In order to impart to a computing platform the characteristics of a trusted computing platform, it is necessary to provide the platform with certain inherently trustable functionalities (collectively making up what is herein referred to as a "trusted entity") which are physically or logically bound to the platform and operate, together with elements of the computing platform, to provide the desired trusted characteristics (minimally, integrity measurement and reporting). In effect, the trusted entity provides the platform with 'roots of trust' and an example of this is given below.

For trusted platforms following the TCG Specifications, the trusted entity is called a Trusted Platform Module ("TPM") and serves to provide, together with elements of the computing platform to which the trusted entity is bound, the following "roots of trust":

A root of trust for measurement (RTM)—the RTM is a computing engine capable of making inherently reliable integrity measurements and is typically the normal platform computing engine (main processor) controlled by the so-called core root of trust for measurement (CRTM), that is the instructions executed by the platform when it acts as the RTM. The CRTM is logically part of the aforesaid trusted entity and would ideally be included in the TPM but for cost reasons is usually implemented by a separate ROM.

A root of trust for storage (RTS)—the RTS is a computing engine capable of maintaining an accurate summary in PCRs of values of integrity measurement digests; the RTS may also provide for 'protected storage' serving to protect data (frequently keys) held in external storage devices as opaque "blobs" with access to a blob's data being controlled by the RTS against specified access-control conditions such as proof of knowledge of a secret and/or the existence of a particular environment (as indicated by PCR values).

A root of trust for reporting (RTR)—the RTR is a computing engine responsible for establishing platform identities, reporting platform configurations (PCR values), protecting reported values and establishing a context for attesting to reported values. The RTR shares responsibility of protecting measurement digests with the RTS.

It may be noted that, as indicated above, the elements forming the RTM are typically (though not necessarily) outside a TPM; in contrast, the RTS and RTR are normally provided by the TPM itself.

Generally, any trusted platform will provide such roots of trust (though possibly in a different conceptual arrangement).

A trusted entity can be embodied as a hardware device (which may include a program-controlled processor) or in software for execution by a main processor of the platform (in which case it is usually referred to as a 'virtual' trusted entity/device or in the case of a TPM, a virtual TPM). In practice, virtual trusted entities are normally provided on platforms that have a basic hardware trusted entity for the basic platform environment but which employ further trusted entities for virtual environments created on the platform. A hardware trusted entity is usually physically bound to the platform with which it is associated whereas a software trusted entity is logically bound to the platform with which it is associated.

It is, of course, also possible to implement a trusted entity as a combination of hardware device and software intended for execution on the platform; where the trustworthiness of the software can be established by a chain of trust rooted in the RTM.

The functionality of the trusted entity can be distributed between multiple devices (in the case of a hardware embodiment) or code blocks (in the case of a 'virtual' embodiment).

The trusted entity uses cryptographic processes but does not necessarily provide an external interface to those cryptographic processes. The trusted entity should be logically protected from other entities—including other parts of the platform of which it is itself a part. Also, most desirable implementations provide the trusted entity with protective features to protect secrets stored by or being processed by the trusted entity by making them inaccessible to other platform functions, and provide an environment that is substantially immune to unauthorised modification.

For a hardware embodiment, the trusted entity, therefore, preferably consists of one physical component that is tamper-resistant. Techniques relevant to tamper-resistance are well known to those skilled in the art of security. These techniques include methods for resisting tampering (such as appropriate encapsulation of the trusted entity), methods for detecting tampering (such as detection of out of specification voltages, X-rays, or loss of physical integrity in the trusted entity casing), and methods for eliminating data when tampering is evident. As regards a 'virtual' trusted entity, although software may not afford such a high degree of tamper-resistance as a hardware device, this may be compensated for by additional protection measures. For example, the software code may include self-test functions, to check the integrity of the trusted functionality.

Chain of Trust

The trustable integrity measurement and reporting enabled by the presence of the trusted entity in the platform typically enables trust to be placed in other platform components or functions which in turn perform trustable integrity measurement of further platform components or functions and so on. This process of extending the boundary of what is trustable is called "transitive trust" and can be thought of as establishing a chain of trust rooted in the platform's roots of trust. Thus in a typical example:

the trusted code for effecting an initial integrity measurement (the CRTM in TCG parlance) serves to measure an integrity metric of OS loader code to enable trust to be placed in this code (if the metric match the expected value);

the OS loader code in turn determines an integrity metric for Operating System code to enable trust to be placed in the operating system;

the operating system in turn determines an integrity metric for application code to enable trust to be placed in the application.

First Example

Prior-Art Trusted Platform—Overview

An example trusted computing system comprising a trusted computing platform 10 is illustrated in the diagram in FIG. 1. The computing platform 10 is shown as a so-called personal computer and is entirely conventional in appearance—it has associated the standard features of a keyboard 14, mouse 16 and visual display unit (VDU) 18, which provide the physical 'user interface' of the platform. The computing platform 10 is arranged to run a standard operating system such as Microsoft™ Windows XP™.

Figure 2:
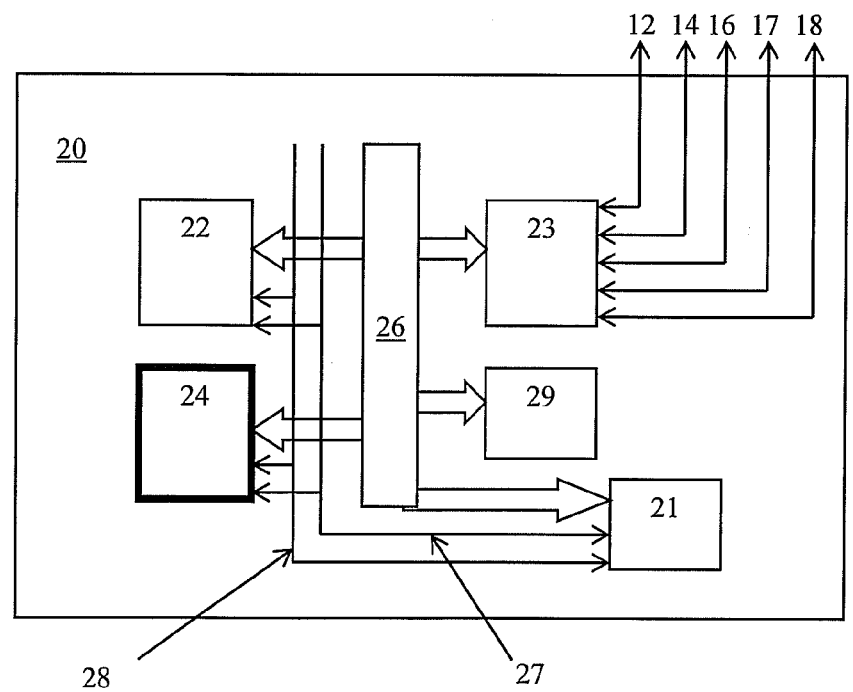
FIG. 2 is a functional block diagram indicating functional elements present on the motherboard of a prior-art trusted computing platform.

As illustrated in FIG. 2, the motherboard 20 of the trusted computing platform 10 includes (among other standard components) a main processor 21, main memory 22, a trusted entity here embodied in the form of trusted device 24 (such as a hardware TPM), a data bus 26 and respective control lines 27 and address lines 28, BIOS memory 29 containing the BIOS program for the platform 10, an Input/Output (IO) device 23, which controls interaction between the components of the motherboard and the keyboard 14, the mouse 16 and the VDU 18, and an I/O device 25, for example an Ethernet controller, for controlling communications with remote devices or systems. The main system memory 22 is typically random access memory (RAM). In operation, the platform 10 loads the operating system, in this case Windows XP™, into RAM from hard disk (not shown). Additionally, in operation, the platform 10 loads the processes or applications that may be executed by the platform 10 into RAM from hard disk (not shown). The mounting of the trusted device 24 on the mother board serves to bind it to the platform.

Typically, in a personal computer, the BIOS program is located in a special reserved memory area, such as the upper 64 K of the first megabyte of the system memory (addresses F000h to FFFFh), and the main processor is arranged to look at this memory location first, in accordance with an industry wide standard. A significant difference between the trusted platform under discussion and a conventional platform is that, after reset, the main processor is initially controlled by core root of trust (CRTM) code (which in the present example comprise hash function code stored in the trusted device 24), which then hands control over to the platform-specific BIOS program, which in turn initialises all input/output devices as normal. After the BIOS program has executed, control is handed over as normal by the BIOS program to an operating system program, such as Windows XP™, which is typically loaded into main memory 22 from a hard disk drive (not shown).

The main processor 21 is initially controlled by the CRTM code because it is necessary to place trust in the first measurement to be carried out on the trusted platform. The CRTM code is typically trusted at least in part because its provenance. As already indicated, the main processor 21 when under control of the CRTM forms a "root of trust for measurement" (RTM). As is typical, one role of the RTM in the present case is to measure other measuring agents before these measuring agents are used and their measurements relied upon. The RTM is the basis for the aforementioned 'chain of trust'. Note that the RTM and subsequent measurement agents do not need to verify subsequent measurement agents; they merely measure and record them before they execute. This is called an "authenticated boot process". Valid measurement agents may be recognised by comparing a digest of a measurement agent against a list of digests of valid measurement agents. Unlisted measurement agents will not be recognised, and measurements made by them and subsequent measurement agents are deemed to be suspect.

Further details will now be given of an implementation of the trusted device 24, it being understood that corresponding functionality can be provided in a software trusted entity (that is, virtual trusted device).

Figure 3:
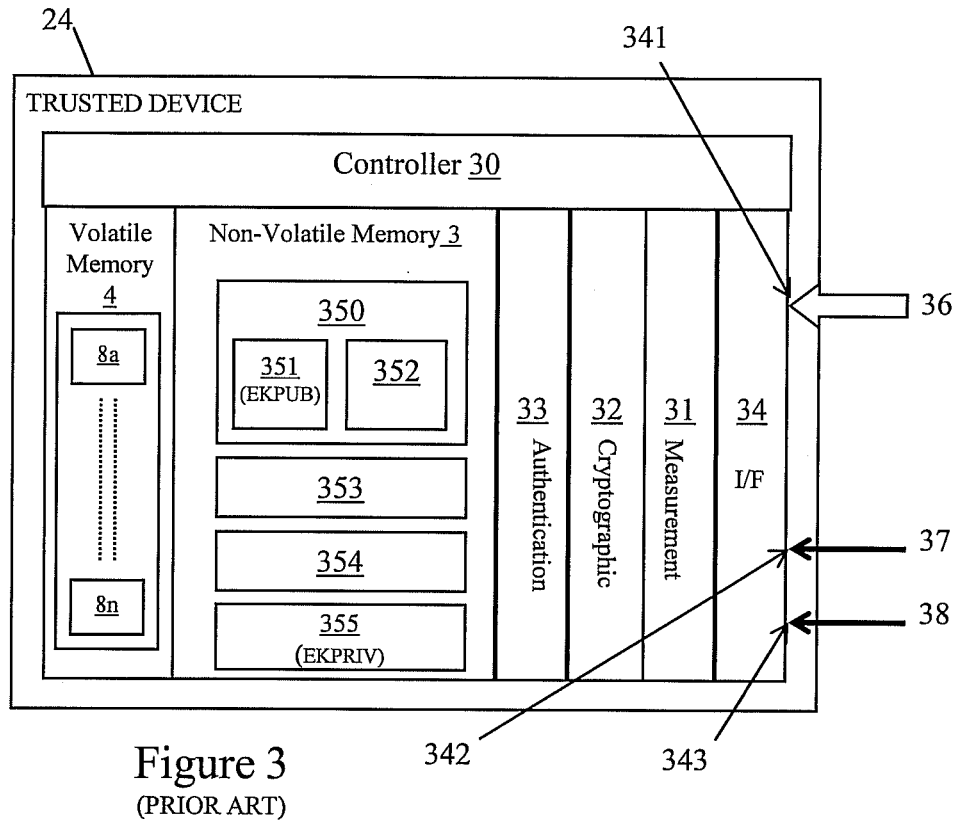
FIG. 3 is a functional block diagram indicating the functional elements of a prior-art trusted entity of the trusted computing platform of FIG. 2.
Figure 4:
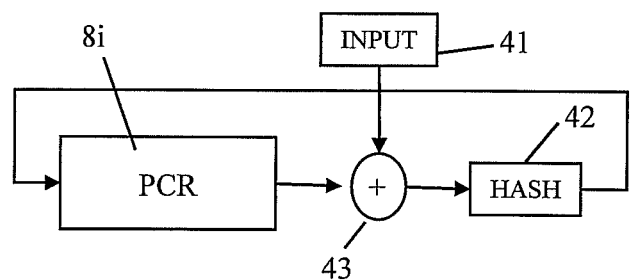
FIG. 4 is a flow diagram illustrating the known prior-art process of extending values into a platform configuration register of the trusted entity of FIG. 3.

The trusted device 24 comprises a number of blocks, as illustrated in FIG. 3. As already indicated, after system reset the trusted device 24 participates in an authenticated boot process to ensure that the operating state of the platform 10 is recorded in a secure manner. During the authenticated boot process, the trusted device 24 acquires at least one integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface; in a particularly preferred arrangement, the display driver (or at least a trusted part thereof) for the computing platform is located within the trusted device 24 with the result that a local user can trust the display of data provided by the trusted device 24 to the display—this is further described in the applicant's International Patent Application No. PCT/GB00/02005, entitled "System for Providing a Trustworthy User Interface" and filed on 25 May 2000, the contents of which are incorporated by reference herein.

Specifically, the trusted device 24 in the present embodiment comprises: a controller 30 programmed to control the overall operation of the trusted device 24, and interact with the other functions on the trusted device 24 and with the other devices on the motherboard 20; a measurement function 31 for acquiring a first integrity metric from the platform 10 either via direct measurement or alternatively indirectly via executable instructions to be executed on the platform's main processor; a cryptographic function 32 for signing, encrypting/decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. As has already been described, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

The non-volatile memory 3 of the trusted device 24 stores a private key 355 (PRIVEK) of an Endorsement key (EK) pair specific to the trusted device 24; preferably, the non-volatile memory 3 also stores a certificate 350 containing at least the public key 351 (PUBEK) of the Endorsement key pair of the trusted device 24 and an authenticated value 352 of at least one platform integrity metric measured by a trusted party (TP). The certificate 350 is signed by the TP using the TP's private key prior to it being stored in the trusted device 24. In later communications sessions, a user of the platform 10 can deduce that the public key belongs to a trusted device by verifying the TP's signature on the certificate. Also, a user of the platform 10 can verify the integrity of the platform 10 by comparing one or more acquired integrity metric(s) with the authentic integrity metric value(s) 352. If there is a match, the user can be confident that the platform 10 has not been subverted. Knowledge of the TP's generally-available public key enables simple verification of the certificate 350. The non-volatile memory 35 may also contain an identity (ID) label 353. The ID label 353 is a conventional ID label, for example a serial number, which is unique within some context. The ID label 353 is generally used for indexing and labelling of data relevant to the trusted device 24, but is insufficient in itself to prove the identity of the platform 10 under trusted conditions.

As already indicated, the trusted device 24 cooperates with other elements of the platform 10 to reliably acquire at least one integrity metric of the platform. In the present embodiment, a first integrity metric is acquired by having the main platform processor execute the CRTM code 354 that is stored in the non-volatile memory 3 trusted device 24; the CRTM when executed by the platform processor generates a digest of the BIOS instructions in the BIOS memory and passes it to the measurement function for storage. Such an acquired integrity metric, if verified as described above, gives a potential user of the platform 10 a high level of confidence that the platform 10 has not been subverted at a hardware, or BIOS program, level.

It would alternatively be possible to provide a measurement engine within the trusted device and have this engine form an integrity measurement on the BIOS code on platform start up (reset).

In the present example, the measurement function 31 has access to the non-volatile memory 3 (for accessing the CRTM hash code 354) and volatile memory 4 (for storing acquired integrity metric measurements). The trusted device 24 has limited memory, yet it may be desirable to store information relating to a large number of integrity metric measurements. This is done in trusted computing platforms as described by the Trusted Computing Group by the use of Platform Configuration Registers (PCRs) 8a-8n. The trusted device 24 has a number of PCRs of fixed size (the same size as a standard measurement digest)—on initialisation of the platform, these are set to a fixed initial value. Integrity measurements are then "extended" into PCRs by a process shown in FIG. 4. The PCR 8i value is concatenated 43 with the input 41 which is the value of the integrity measurement to be extended into the PCR. The concatenation is then hashed 42 to form a new 160 bit value. This hash is fed back into the PCR to form the new value of the integrity metric concerned. In addition to the extension of the integrity measurement into the PCR, to provide a clear history of measurements carried out the measurement process may also be recorded in a conventional log file (which may be simply in main memory of the computer platform). For trust purposes, however, it is the PCR value that will be relied on and not the software log.

Clearly, there are a number of different ways in which an initial integrity metric value may be calculated, depending upon the scope of the trust required. The measurement of the BIOS program's integrity provides a fundamental check on the integrity of a platform's underlying processing environment. The integrity metric measurement should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Protected Storage

As indicated above, a trusted entity such as the trusted device 24 may include trusted functionality (RTS) that provides a 'protected storage' mechanism for locking away data, typically keys or passwords, into an opaque blob held outside the trusted entity, the blob being subsequently unlocked (made accessible beyond the RTS) by the RTS only under specific access conditions such as proof of knowledge of a particular secret and/or when the platform is in a particular (trusted) state as specified at the time the blob is locked by a digest of the values of some or all the PCRs. In this latter case, to unlock the data blob, the same digest must be formed from the current values of the PCRs; if the new digest is not the same as the digest in the opaque blob, then the data cannot be unlocked. Storing data in a blob bound to one or more PCR values, in TCG parlance, is called data 'sealing', and recovering the data is called 'unsealing'. More generally, data can be sealed to any platform state that is deemed suitable by the data owner (this may be a current state or any future state).

Figure 5:
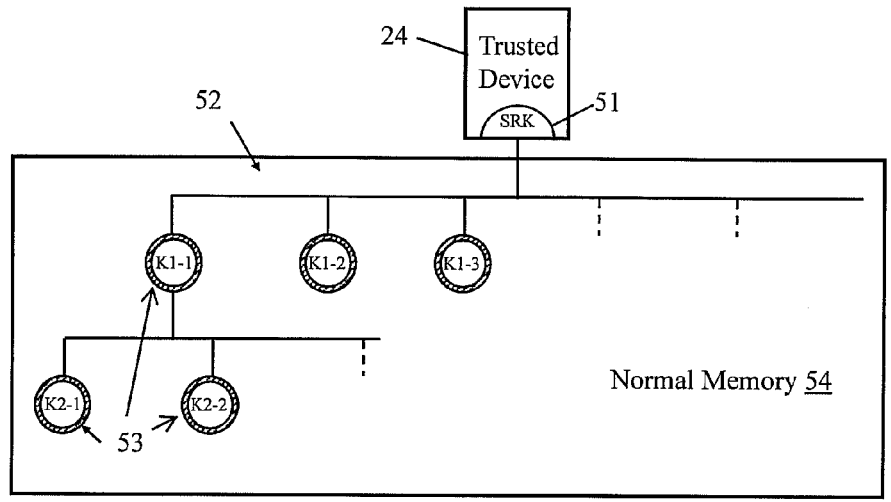
FIG. 5 is a diagram of a key hierarchy associated with a known trusted entity.

One approach to implementing protected storage in the trusted device 24 will now be described, this approach being that used in TPMs. As illustrated in FIG. 5, in this approach, protected storage is implemented as a hierarchy (tree) 52 of data objects the root of which is a Storage Root Key (SRK) 51 that is permanently stored in the trusted device 24 (and not released from it). Apart from the SRK, the tree 52 can be stored outside of the trusted device in normal memory 54. When data in a node is used or revealed, the node is manipulated by the trusted device. Each intermediate node object in the tree is encrypted by a key in the node object above it in the tree (the parent node), all the way back to the SRK root node; in FIG. 5 two levels are shown below the SRK, namely a first level storing keys K1-1 to K1-3 and a second level storing keys K2-1 and K2-2, the encrypted nature of each key being indicated by the surrounding hatched annulus). Intermediate nodes in the tree will always be keys but leaf nodes can be arbitrary data (though frequently they will also be keys, such as symmetric keys for use by application processes in protecting bulk data). Access conditions can be specified for each node, such conditions comprising one or more of the following:

proof of knowledge of particular authorisation data ('authData') by access-requesting entity (done through use of a protocol that does not reveal the AuthData);

the existence of a particular operating environment as determined by a comparison of a current digest of one or more PCR values against a specified digest value;

the 'locality' of the access-requesting entity.

The access conditions applicable to a node are stored in the node. Keys in the tree can either be "non-migratable" meaning that the private key is only known to and usable by the trusted device, or "migratable" meaning that there is no guarantee about the origin and use of the private key.

Second Example

Prior-Art Trusted Platform

Assuming that integrity metrics are recorded for the operating system and applications loaded by the operating system, the above-described trusted platform 10 enables a user to check the state of the platform and decide whether or not to trust it. If the operating system has run an application that is not trusted by a first user (though possibly trusted by a different user), the first user can detect this (even after the application has terminated) by checking the relevant PCRs. However, in this case, for the above-described trusted platform, the only way for trust in the platform to be re-established for the first user is for the platform to be re-started. This drawback is multiplied where the platform is used to run a compartmented operating system supporting multiple computing environments since, unless appropriate measures are in place, running an un-trusted application in any of the environments requires the platform to be re-started to re-establish trust.

A solution to this is to provide a hardware/software architecture that enables the core software (BIOS & operating system/hypervisor) to be isolated from higher-level software so that if the latter is not trusted, it is only necessary to rebuild trust from the core software (assuming the latter is trusted). Where the core software supports multiple computing environments, then provided the latter are isolated from each other, an un-trusted environment can be restarted without restarting the core software or the other computing environments supported by it. Furthermore, where multiple computing environments are supported, it is convenient to provide a respective trusted entity (typically a virtual trusted device) for each such environment.

An example trusted platform 60 supporting multiple isolated computing environments will now be briefly described with reference to FIG. 6. A fuller description of various forms of trusted platform of this type can be found in US published patent application US 2005/0223221, incorporated herein by reference.

Figure 6:
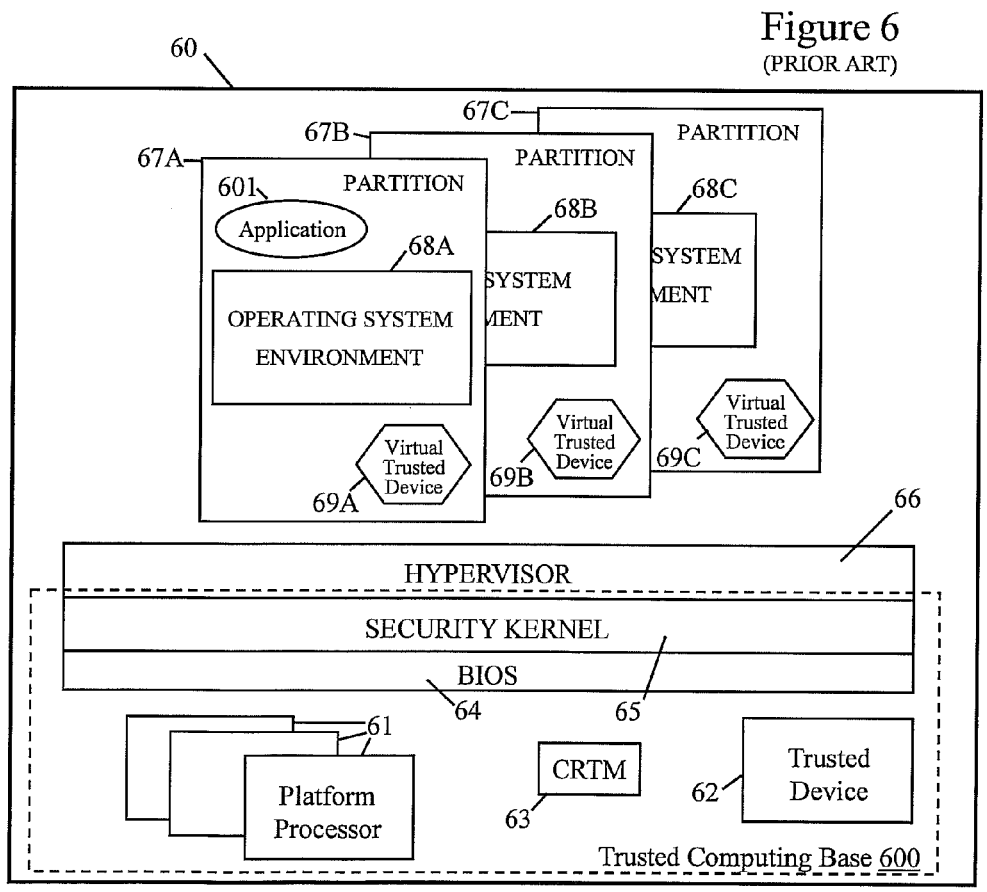
FIG. 6 is a functional block diagram of a further prior-art computing platform running a hypervisor and providing for multiple isolated operating system environments.

The trusted platform 60 shown in FIG. 6 has one or more platform processors 61 and a hardware trusted device 62 similar to the previously described trusted device 24 but with the code forming the CRTM being in a separate ROM 63. In equivalent manner to that described above for the platform 10 and trusted device 24, following a platform reset, the CRTM code is run by one of the main platform processor 61 to determine an integrity metric for the BIOS code (stored for example in the same ROM 63 as the CRTM) and pass the metric to the trusted device 62 for insertion into a PCR. Thereafter, the BIOS is loaded 64 which in turn measures and records in trusted device 62 an integrity metric of security kernel code before loading the security kernel 65; the security kernel 65 then measures and records in trusted device 62 an integrity metric of hypervisor code before loading the hypervisor 66 (also called a virtual machine monitor). In practice, there will typically be more integrity metrics recorded and intermediate code modules loaded. The elements 61 to 65 form the trusted computing base 600 of the platform 60. The hypervisor 66 may also be considered part of the trusted computing base with the proviso that for any complex program such as hypervisor 66, while it is possible to verify that the hypervisor code on the platform is identical to a reference version, it is very difficult to be sure that the reference version itself does not possess any security weaknesses.

The hypervisor 66 enables a plurality of operating system environments to be provided each in its own partition isolated from the other operating system environments; in FIG. 6, by way of example, three operating system environments 68A, 68B and 68C are shown, each in its own respective partition 67A, 67B, 67C; each partition may be arranged to execute on a different platform processor 61, thereby improving the degree of isolation. The hypervisor 66 enables and protects communications between the partitions and with the outside world. Applications are run as required in an appropriate one of operating system environment; in the present case one application 601 is shown running in operating system environment 68A.

Additional and/or alternative guarantees of separation of the partitions can be provided by using a main platform processor that provides multiple privilege levels. In this case the BIOS 64 and the security kernel 65 are, for example, run at the most privileged level of the main platform processor 61 while the hypervisor 66 is run at the second most privileged level of the main platform processor 61. All other code is run at a lower privilege level (applications typically run at the lowest privilege level, below that of the operating system environments) thus providing isolation of the BIOS 64, the security kernel 65 and the hypervisor 66 from potentially untrustworthy code.

It will be appreciated that, in effect, each partition 67A, 67B, 67C provides a virtual computing platform environment, which is substantially independent of (e.g. encapsulated or compartmentalised) other such computing environments. To a user, such an environment appears to behave in exactly the same way as a standard, standalone computing platform, even down to the ability to re-boot the platform: where a re-boot operation of a virtual computing platform re-boots only the resources available in the relevant partition (in other words, a re-boot operation would not have any effect on other virtual computing platforms).

In the present example, each partition 67A, 67B, 67C has its own associated virtual trusted device 69A, 69B, 69C (although shown in FIG. 6 in each partition, the virtual trusted devices are logically part of the security kernel and, for a main processor with privilege levels, can be run at the same privilege level as the security kernel or in a separate partition). The hardware trusted device 62 is responsible for storing integrity metrics of the code for the virtual devices and related trust functionality (such as virtual RTM). Thereafter, the virtual trusted device 69 of a partition is responsible for recording and reporting integrity metrics for the related operating system environment and any applications it is running. Each virtual trusted device has its own AIK(s) for signing its integrity metric reports; such an AIK is issued by a credible entity (which could be the hardware trusted device 62) on the basis of the integrity measures reported by the device 62 for the trusted computing base and the virtual trusted device code. A full report of the integrity metrics relevant to an application in a given partition is a combination of:

- the integrity metrics for the trusted computing base and virtual trusted device code, signed by the hardware trusted device; and
- the integrity metrics of the application and its operating system environment, signed by the relevant virtual trusted device.

It will be appreciated that the isolation provided by the platform 60, minimises the software that must be re-started to re-establish trust in any particular partition. It will also be appreciated that the arrangement of having one hardware trusted device 62 for the trusted computing base 600 and one virtual trusted device per partition is merely one possibility among many, including just having a single hardware or virtual trusted device for the entire platform.

Exemplary Embodiment

Figure 7:
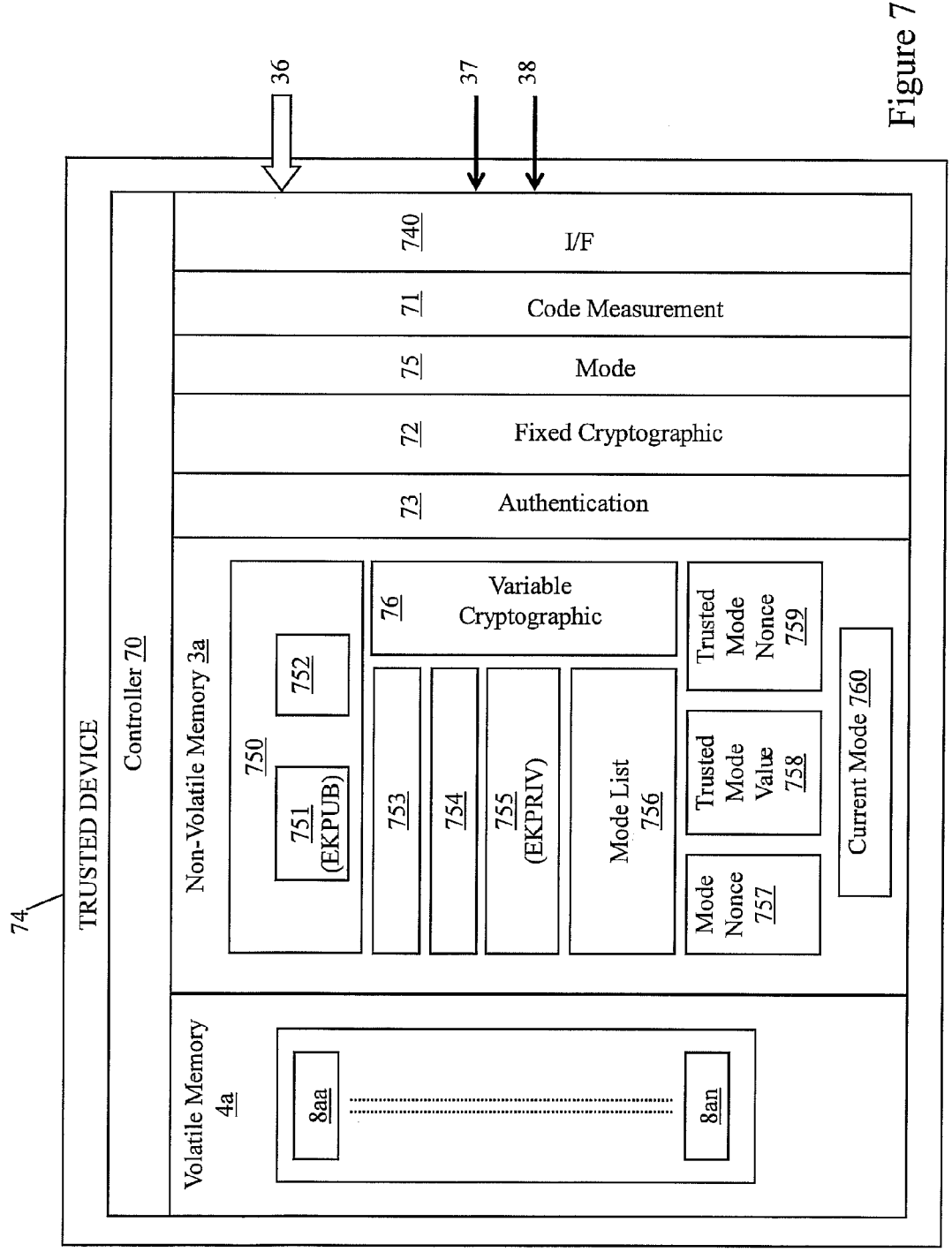
FIG. 7 is a functional block diagram of a trusted entity according to an embodiment of the present invention.

A trusted device according to an exemplary embodiment of the present invention will now be described with reference to FIG. 7.

A trusted device 74 according to an embodiment of the invention comprises a number of blocks. Many of the blocks and aspects of the operation of the trusted device 74 are in common with the known trusted device 24 of FIG. 3, and will not be described in detail again. Indeed, the trusted device 74 according to the present embodiment has functionality that is a superset of the functionality of the trusted device 24 in FIG. 3; although this need not be the case in other embodiments. The trusted device 74 according to the present embodiment can be integrated into the same kind of trusted platform that is illustrated in FIGS. 1 and 2.

Specifically, the trusted device 74 in the present embodiment comprises: a controller 70 programmed to control the overall operation of the trusted device 74, and interact with the other functions on the trusted device 74 and with the other devices on a suitable motherboard, for example motherboard 20, of a computing platform 10; a code measurement function 71 (equivalent to measurement function 31) for acquiring a first integrity metric from the platform either via direct measurement or alternatively indirectly via executable instructions to be executed on the platform's main processor; a fixed cryptographic function 72 (equivalent to cryptographic function 32) for signing, encrypting/decrypting specified data, using algorithms that are shipped with the device; an authentication function 73 (equivalent to authentication function 33) for authenticating a smart card; and interface circuitry 740 (equivalent to interface circuitry 34) having appropriate ports (36, 37 & 38) for connecting the trusted device 74 respectively to a data bus 26, control lines 27 and address lines 28 of motherboard 20. Each of the blocks in the trusted device 74 has access (typically via the controller 70) to appropriate volatile memory areas 4a and/or non-volatile memory areas 3a of the trusted device 74. In addition, the trusted device 74 is designed, in a known manner, to be tamper resistant.

As with trusted device 24, the trusted device 74 may be implemented as an ASIC or as an appropriately programmed micro-controller.

The non-volatile memory 3a of the trusted device 24 stores a private key 755 (EKPRIV) of an Endorsement key (EK) pair specific to the trusted device 74; preferably, the non-volatile memory 3a also stores a certificate 750 containing at least the public key 751 (EKPUB) of the Endorsement key pair of the trusted device 74 and an authenticated value 752 of at least one platform integrity metric measured by a trusted party (TP). The certificate 750 is signed by the TP using the TP's private key prior to it being stored in the trusted device 74. The keys and certificates are employed in use as already described above. The non-volatile memory 3a may also contain an identity (ID) label 753. The ID label 753 is a conventional ID label, for example a serial number, which is unique within some context. The ID label 753 is generally used for indexing and labelling of data relevant to the trusted device 74, but is insufficient in itself to prove the identity of the platform 10 under trusted conditions.

The trusted device 74 also includes in non-volatile memory 3a CRTM code 754, and in volatile memory 4a PCR registers 8aa-8an; both of which are functionally equivalent in operation and use to the counterpart elements in trusted device 24.

In addition to the hitherto known elements, the trusted device 74 comprises a mode function 75, which is operable to determine, update, report, lock and control an operating mode of the trusted device 74, as will be described below. The fixed cryptographic functions 72 provides fixed cryptographic algorithms but may allow the cryptographic parameters for those fixed cryptographic algorithms to be altered. In addition to the fixed cryptographic function 72, there is provided a variable cryptographic function 76. The variable cryptographic function 76 is in non-volatile memory 3a and is arranged to be able to receive new, for example user-defined, cryptographic algorithms, after the trusted device has been shipped. The algorithms may be individual algorithms or sets of algorithms. As such, there may be, among the fixed and variable cryptographic functions, plural kinds of algorithms and/or parameters that can selectively and interchangeably enact particular kinds of operation. For example, there may be a plurality of different algorithm and parameter combinations by which encryption may be enacted, and some combinations will intrinsically be stronger and safer than others.

Further, the trusted device 74 includes, in non-volatile memory 3a, mode of operation information. In the present example, the mode of operation information comprises: a mode nonce register 757; a trusted mode value register 758; a trusted mode nonce register 759 and a current mode register 760. The values held in these registers characterise the mode of operation of the trusted device in different ways, as will be described. Finally, the trusted device 74 has stored in non-volatile memory 3a a mode list table 756, an example of which is illustrated in FIG. 8. The mode list table 756 identifies all the potential operating modes of the trusted device (apart from, potentially, a mode0, as will be described below).

The mode nonce register 757 contains a randomly generated nonce, which is selected each time the operating mode of the trusted device changes. The purpose of this nonce is to make it easy to identify when a trusted device's mode setting is changed. In other words, this register characterises the mode of operation by indicating when the mode has changed rather than by indentifying the mode.

The trusted mode value register 758 is a flag that indicates whether the trusted device is in a mode recommended and defined by a trusted party. In this example, the trusted party is the TCG; and the trusted mode value register will hereafter be referred to as the TCG mode value register. In other embodiments, additional or alternative mode value registers may be provided, which may be associated with different trusted parties, for example, a government agency or an OEM of the platform. For example, the mode-value might be zero (FALSE) if the trusted device is in a mode that is not recommended by the TCG, but might be non-zero (TRUE) if the trusted device is in any of the modes recommended and defined by the TCG. The purpose of this flag is to make it easy to identify when the TPM is in a mode recommended by TCG, presumed to be a safe mode, not in a mode defined by TCG but not recommended by TCG, and not in a mode neither defined nor recommended by TCG. Unlike the mode nonce register 757, this register characterizes the mode of operation of the trusted device directly, by indicating that the mode is a TCG mode.

The trusted mode nonce register 759 is a randomly chosen value selected every time that the trusted-mode value changes its Boolean value. In this example, the trusted party is the TCG; and the trusted mode nonce register will hereafter be referred to as the TCG mode nonce register. In other embodiments, additional or alternative mode nonce registers may be provided, which may be associated with different trusted parties, for example, a government agency or an OEM of the platform. The purpose of this nonce is to make it easy to identify when a trusted device's mode setting has changed from a TCG recommended setting to another setting that is not recommended by TCG. In other words, like the mode nonce register 757, this register characterises the mode of operation by indicating when the mode has changed rather than by identifying the mode.

The current mode register 760 indicates the current operating mode of the trusted device. The current operating mode may be a mode that the trusted device is set to operate in or it may simply represent the mode that is characterized by the most recent cryptographic operation that was performed by the trusted entity.

It will be appreciated that, in this example, the party entrusted to recommend safe cryptographic algorithms is the TCG. It would in principle be possible for proxies of the TCG, or different parties entirely (e.g. ranging from an IT department in an organization to a government) to have the role of recommending safe algorithms, and further or different mode-related registers assigned to those parties could be provided. Indeed, the trusted device may contain recommendations from a few or even many different organizations, each organization requiring use of only its recommended algorithms/modes. In such cases, it may be an advantage to have an equivalent of a mode nonce, a TCG mode value and a TCG mode nonce for each organization.

The table in FIG. 8 illustrates an exemplary mode list table 756. Each row 810 of the table defines a potential mode of operation, according to an embodiment of the present invention. In the table are shown Mode1, Mode2, Mode3 and ModeN in the first column. There could be any number of modes, some of which may be shipped with the trusted device 74 and some which may be defined by an owner or user of the trusted device 74. Each mode row is characterised as follows:

A mode name 812 (e.g. Mode1-ModeN), which is a statistically unique identifier that is cryptographically derived from the characteristics of the mode.

A flag, TCG Mode 814, indicating whether the mode is recommended by the TCG. TCG modes will typically be shipped with the trusted device, for example being one of the fixed cryptographic functions 72. However, there is no technical reason why other TCG approved algorithms and parameter settings could not be installed into the variable cryptographic function 76 after shipping. Of course, such subsequently installed modes (and associated algorithms and parameters) would need to be accompanied by an appropriate certificate to prove the TCG (or other legitimate) origin. The TCG mode is not owner or user-modifiable: it is either TCG-approved, according to appropriate TCG attestation, or is not TCG approved. According to the present embodiment, the trusted device is able to attest to a user (or a software application addressing the trusted device), using the TCG mode flag, that current cryptographic algorithms and parameter settings are recommended by the TCG, thereby alleviating the requirement for software developers to have a detailed understanding of what makes a cryptographic key safe or unsafe: the assumption being that a TCG-approved mode is intrinsically safe. In practice, a mechanism would typically also be provided whereby the TCG (or other trusted party) can revoke a mode, for example because the associated algorithm(s) have been discredited. Such a mechanism would, for example, need to be facilitated using an appropriate certificate to prove the TCG origin.

Each mode may have one or more cryptographic algorithms 816 (illustrated as Algorithm A, Algorithm B, Algorithm C and Algorithm D), four of which (e.g. Algorithm1-Algorithm4 for Mode1) are shown for each mode but the number may vary. Exemplary cryptographic algorithms are RSA, Elliptic Curve, etc. Each algorithm may appear in one or more modes; for example, Algorithm1 appears in each of Mode1, Mode2 and Mode3.

Associated parameters 820 (e.g. Parameters1 for Algorithm1) for each cryptographic algorithm 818. Parameters might be key size and exponent for RSA, key length and curve for elliptic curve, etc. Parameters might be wild cards, meaning that any parameter setting is permitted. The associated parameters for an algorithm that appears in multiple modes may be the same or different. For example, the parameters associated with algorithm1 in Mode1 and Mode2 are the same while the parameters for algorithm1 in Mode3 are different.

An associated name 822 (e.g. Name1 for Algorithm1) for each cryptographic algorithm, comprising a statistically unique identifier that is cryptographically derived from the characteristics of the algorithm. Accordingly, the name (name1) is the same for algorithm1 in Mode1 and Mode2, because the parameters (parameters1) are the same, whereas the name (name12) associated with algorithm1 in Mode3 is different, because it has different parameters (parameters12).

In this example, the mode name 810 is a hash of the associated algorithm names 822 for that mode. For example:

Mode1=Hash{Name1|Name2|Name3|Name4}.

In this way it is in practical terms impossible for two modes to have the same name and, therefore, one mode cannot masquerade as another.

Likewise, the algorithm name 822 is, for example, a hash of the parameters that define the cryptographic algorithm. For example:

Name1=Hash{Algorithm1|Parameters1}

Again, in practical terms, this prevents one algorithm and its settings masquerading as another. According to embodiments of the invention, the mode and algorithm names are accompanied by an identifier (hashID) of the hash algorithm used, for example SHA-1, SHA-256 or MD4 to name a few, to generate the name, so that the hash can be verified using the correct hash algorithm in later verification operations.

As described, the mode function of the trusted device 74 is arranged to enact various mode-related roles, including (but not limited to):

reading and reporting the mode nonce 757, the TCG mode value 758, the TCG mode nonce 759 and the current mode register 760 to other functions or applications internally or externally of the trusted device;

updating the mode nonce 757, the TCG mode value 758, the TCG mode nonce 759 and the current mode register 760 in response to cryptographic operations requested by internal or external functions or applications;

locking the trusted device in response to owner commands, in order that the trusted device can operate only in specified modes;

reading and updating the mode table 756 in according with authorised additions or alterations; and providing values of the mode nonce 757, the TCG mode value 758, the TCG mode nonce 759 and the current mode register 760 for sealing operations by the trusted device.

An exemplary process for updating certain mode information (e.g. the mode nonce and the TGC mode nonce) by the mode function 75 will now be described with reference to the flow diagram in FIG. 9. Each time an application issues a request [step 900] for the trusted device 74 to enact an operation involving a cryptographic algorithm plus parameter settings that are supported by the trusted device, the trusted device 74 receives [step 905] the request, which includes an indication of the desired mode and enacts a Mode Updating procedure [step 910], as will now be described. The trusted device compares the submitted cryptographic algorithm plus parameter settings with the algorithms and parameters associated with the names (e.g. Name1, Name2, etc.) in the desired mode in the mode table 756, to establish if the algorithm/parameter combination has a name (i.e. is listed in the desired mode) [step 915]. If not [step 915], the Mode Updating procedure [step 910] completes and the process reports [step 970] to the requesting application that the requested operation has failed, and the application receives the report [step 975]. Alternatively, if the name is listed in the desired mode [step 915], the trusted device compares the desired mode with the mode stored in the current mode register 760 [step 920], to see if the desired mode is the same mode that was last used. If it was, then there is no need to update any of the mode information registers (as the trusted device is being asked to operate in the same mode as before), the Mode Updating procedure [step 910] completes, the requested operation is enacted [step 965] and the success is reported to the requesting application [step 970], which receives the report [step 975]. If the desired mode does not correspond to the mode indicated by the current mode register 760 [step 920], the desired mode is stored [step 925] therein (as it is about to be used) and a new random nonce is generated [step 930] and stored in the mode nonce register 757 [step 935], in order to indicate that a new mode is in use. In addition, the trusted device checks whether the new mode is a TCG mode [step 940]. If it is not, the trusted device sets the TCG Mode value 758 to FALSE [step 945], a new random nonce is generated [step 950] and stored in the TCG mode nonce register 759 [step 955], to indicate that the previous TCG mode has terminated, the Mode Updating procedure [step 910] completes, the trusted device enacts the requested operation [step 965] and the success is reported to the requesting application [step 970], which receives the report [step 975]. If the new mode is a TCG mode, the TCG Mode value 758 is set TRUE [step 960] and a new random nonce is generated [step 950] and stored in the TCG mode nonce register 759 [step 955], to indicate that a different TCG mode is in use. In this instance, again, the Mode Updating procedure [step 910] completes, the trusted device enacts the requested operation [step 965] and the success is reported to the requesting application [step 970], which receives the report [step 975].

Exemplary scenarios in which algorithmic modes may be applied will now be described with reference to the flow diagrams in FIGS. 10 to 13.

Figure 10:
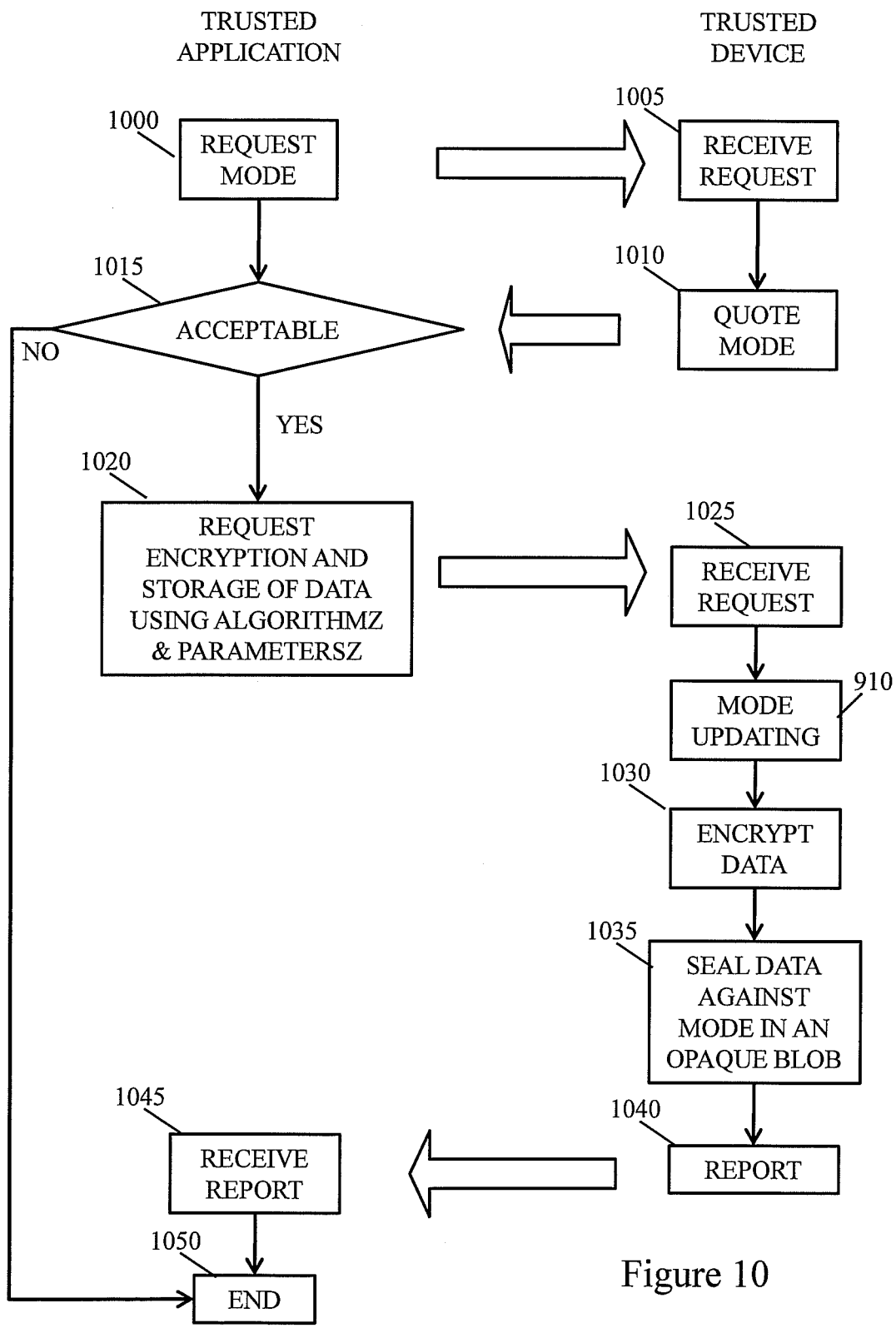
FIG. 10 is a flow diagram illustrating a process of obtaining mode information before using a trusted entity to enact a trusted operation according to an embodiment of the present invention.

According to the flow diagram in FIG. 10, a trusted application wishes to store and seal data using a trusted device 74 according to an embodiment of the present invention. In a first step [step 1000], the application issues a request, for example via a TPM Quote command, for the trusted device to report its current mode state. The trusted device receives the request [step 1005] and reports the mode to the application [step 1010].

The mode information reported back to the application can include any one or more of the mode nonce 757, the TGC mode value 758 and/or the TCG mode nonce 759, and/or the current mode, for example, depending on the request and a security policy set by the owner of the trusted computing platform containing the trusted device. For example, if a quoted mode nonce 757 is the same as that previously quoted, the application can have confidence that the trusted device has always used a particular set of algorithms and parameters since the previous quote operation. In addition, or alternatively, for example, if a quoted TCG mode nonce 759 is the same as that previously quoted, the application can have confidence that the trusted device has always been in a TCG mode since the previous quote operation.

If [step 1015] the implications of the mode information are acceptable to the application, then the application (in this example) issues a request [step 1020] for the data to be securely stored and sealed, using algorithmZ and associated parametersZ to encrypt the data. If the mode information reveals that the trusted device is in (or has been in) an unacceptable state, then the process ends [step 1050].

Figure 9:
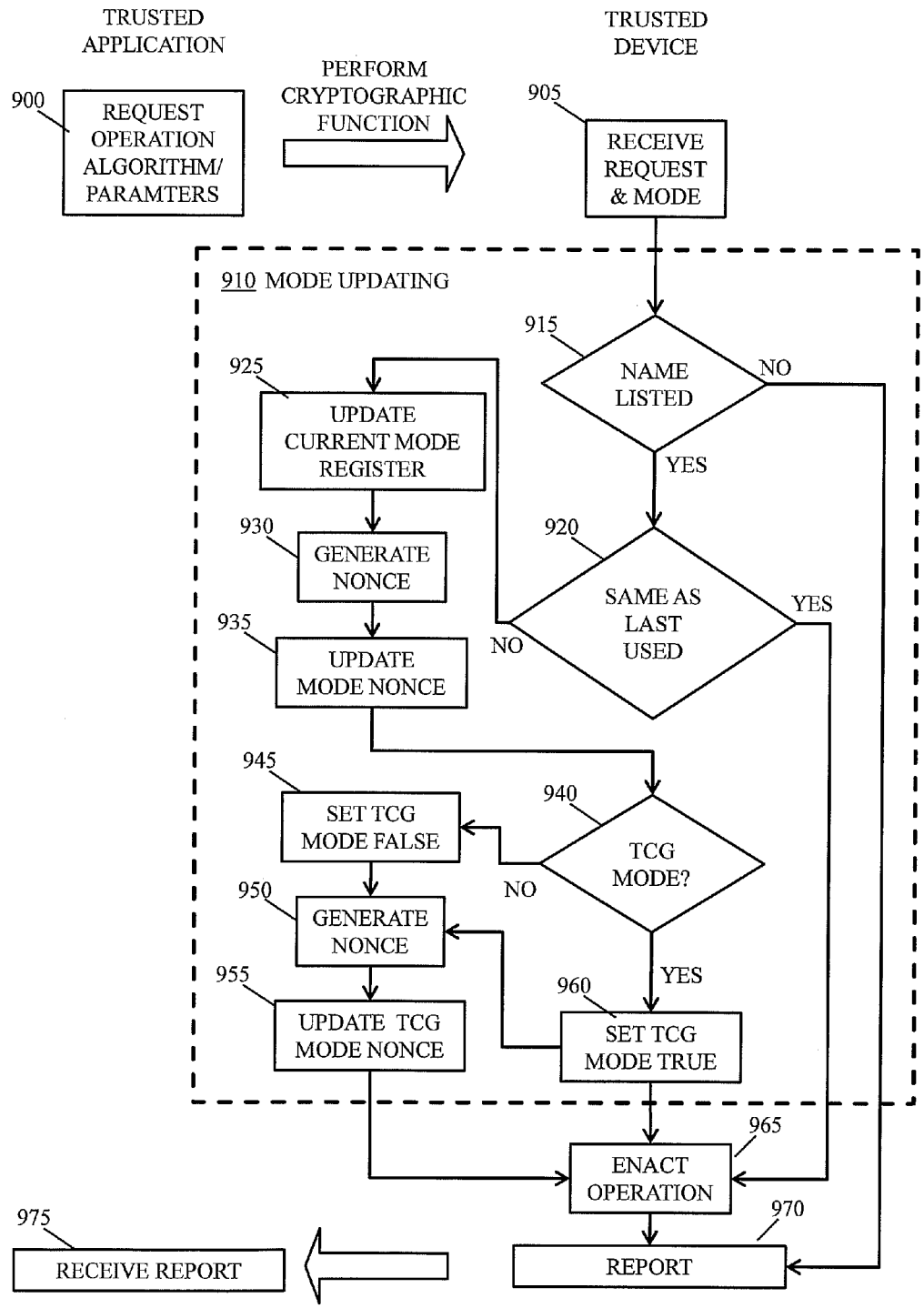
FIG. 9 is a flow diagram illustrating a process of updating mode information of a trusted entity according to an embodiment of the present invention.

If the trusted device has been operating acceptably [step 1015], it receives the request and data [step 1025], enacts Mode Updating, as described in step 910 of FIG. 9, and encrypts the data [step 1030] using algorithmZ, employing parametersZ. The encryption process also seals the data to a selected mode [step 1035] and reports [step 1040] successful completion of the operation to the application. The application receives the report [step 1045] and the process ends [step 1050].

According to embodiments of the invention, the data may be sealed during encryption against any one or more of the mode nonce 757, the TGC mode value 758 and/or the TCG mode nonce 759. Which mode information is in practice used in the seal process may be determined by a platform owner policy, or it may be determined by the application.

It will be appreciated that the operation of sealing data against mode information is functionally similar to sealing data against a platform state (e.g. according to its PCR values). Sealing data against platform mode information provides an alternative or an additional layer of security and assurance to local and/or remote users of the platform. If a platform is able to reliably report its mode of operation, then users can determine whether or not to use the platform. For example a platform that has only been used in TCG modes may be deemed less likely to have been subverted than a platform that reports having been used in a non-TCG mode; for example by applying weaker cryptographic algorithms.

Although not shown in FIG. 10, the data may also be sealed to one or more PCR registers in a known way, in addition to being sealed to mode information.

Figure 11:
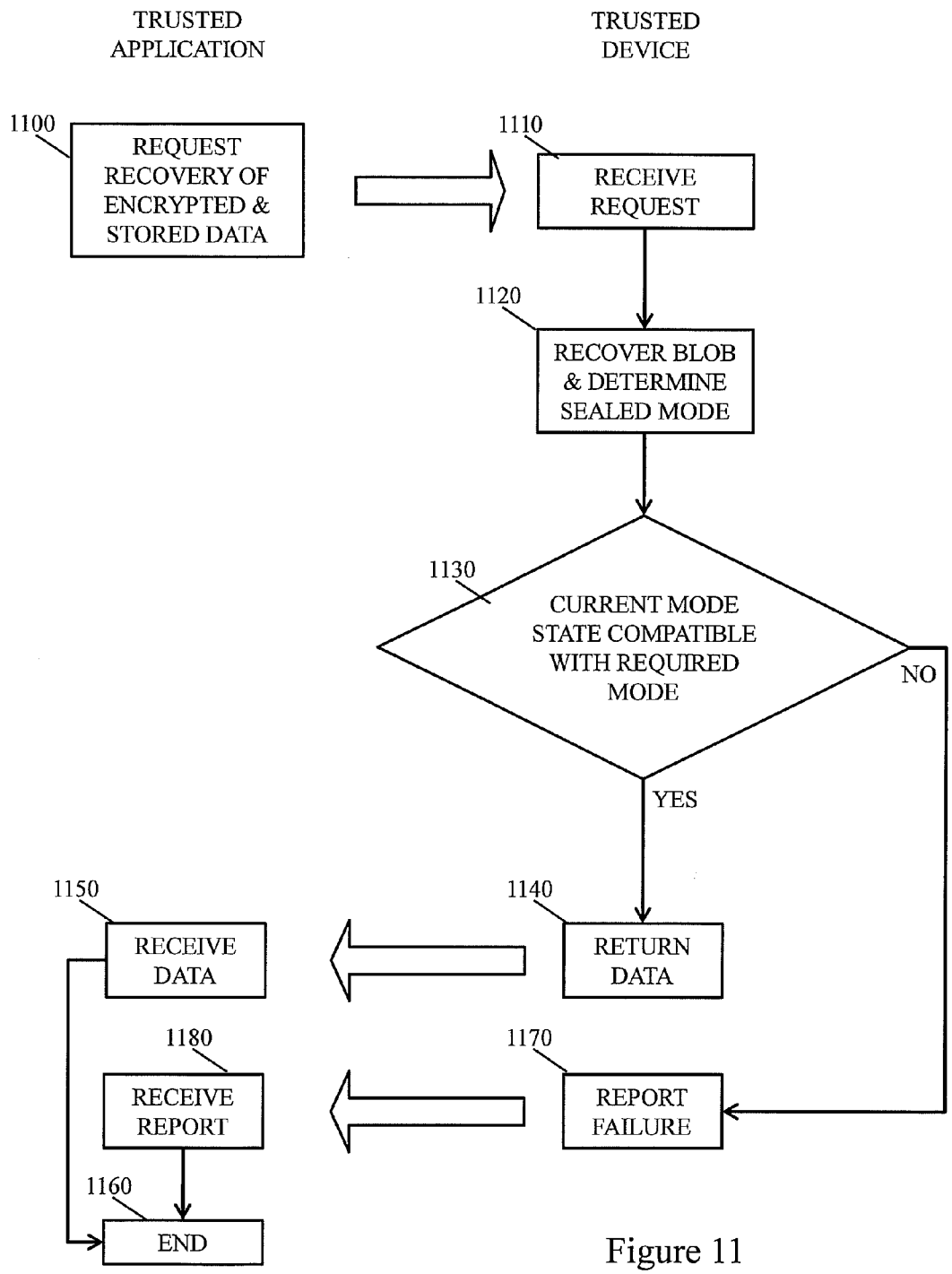
FIG. 11 is a flow diagram illustrating a process of revealing data that has been sealed against mode of operation information according to an embodiment of the present invention.

The flow diagram in FIG. 11 illustrates a data recovery operation according to an embodiment of the present invention. In a first step [step 1100], a trusted application wishes to recover data from trusted storage and issues a request to a trusted device 74. Known, appropriate authentication steps would of course precede this, to enable the application to access the data. The trusted device receives the request [step 1110], recovers the associated blob from storage and determines from the sealed data what the prevailing mode conditions must be for the data to be revealed or used [step 1120]. Next [step 1130], the trusted device determines if its current mode (or mode history, indicated by the mode nonces) is compatible with the required mode of operation. Whether or not the mode is compatible is determined by the policy of the data owner (e.g. the user who stored it) or by a platform policy on behalf of the data owner. Alternative definitions of 'compatibility', for example, include that it is allowable to return the data to the application if:
the trusted device is in any TCG mode, as determined by reference to the TCG mode value register 758;
the operating mode has not changed since the data was stored, by reference to the mode nonce 757; and/or
the operating mode has not at any time during the current boot cycle operated under a non-TCG mode, by reference to the TCG mode nonce 759.

If the prevailing mode of the trusted device complies with the compatibility requirements, the trusted device returns the data to the application or allows the application to use the data [step 1140], the application receives or uses the data [step 1150] and the process ends [step 1160]. Alternatively, a failure report is communicated [step 1170] to the application, the application receives the failure report [step 1180] and the process ends [step 1160]. Although not illustrated in FIG. 11, insofar as the decryption of the data in the blob requires use of a cryptographic algorithm, the mode information may be updated generally in accord with step 910 in FIG. 9.

In effect, a trusted device according to an embodiment of the invention can seal data to any combination of mode name, mode-nonce, TCG-mode-value, TCG-mode-nonce, in the same way that a known TPM can seal data to a PCR value. This prevents the trusted device from revealing or using data if the mode has changed, has changed from a particular TCG mode, or has used a non-TCG mode. The trusted device can include the mode-nonce, TCG-mode-value, TCG-mode-nonce and/or the mode name in a Quote statement. This enables a recipient to know with confidence the current mode of a trusted device, and whether the trusted device has been in a different mode since, for example, the last Quote statement was obtained.

Accordingly, application software can seal data to a specific mode, so that data can never be used outside that mode. The mode might be a specific mode or any one of the TCG modes, for example. Application software can request a Quote statement from a platform, determine that the platform is "safe" to use, perform a service on the platform, request another Quote statement from the platform, and determine whether the trusted device always used "safe" algorithms while the service was being performed. A safe mode might be a specific mode or any one of the TCG modes, for example.

While a trusted device may be controllable to operate in any one or more modes of operation, in some embodiments, the trusted device may be provided with an owner authorised lock so that the owner can 'lock' the trusted device to operate in one or more determined modes. For example, the owner may wish to lock the trusted device to operate only in TCG modes. In this case, the TCG mode value 758 would implicitly always be set to TRUE. In addition, or alternatively, the owner may specify that there should be no mode checking; this may be achieved by setting the trusted device to operate in a particular mode, for example Mode0 (which is typically not listed in the mode table, as it has no algorithms to list), under which no mode checking is done.

Figure 12:
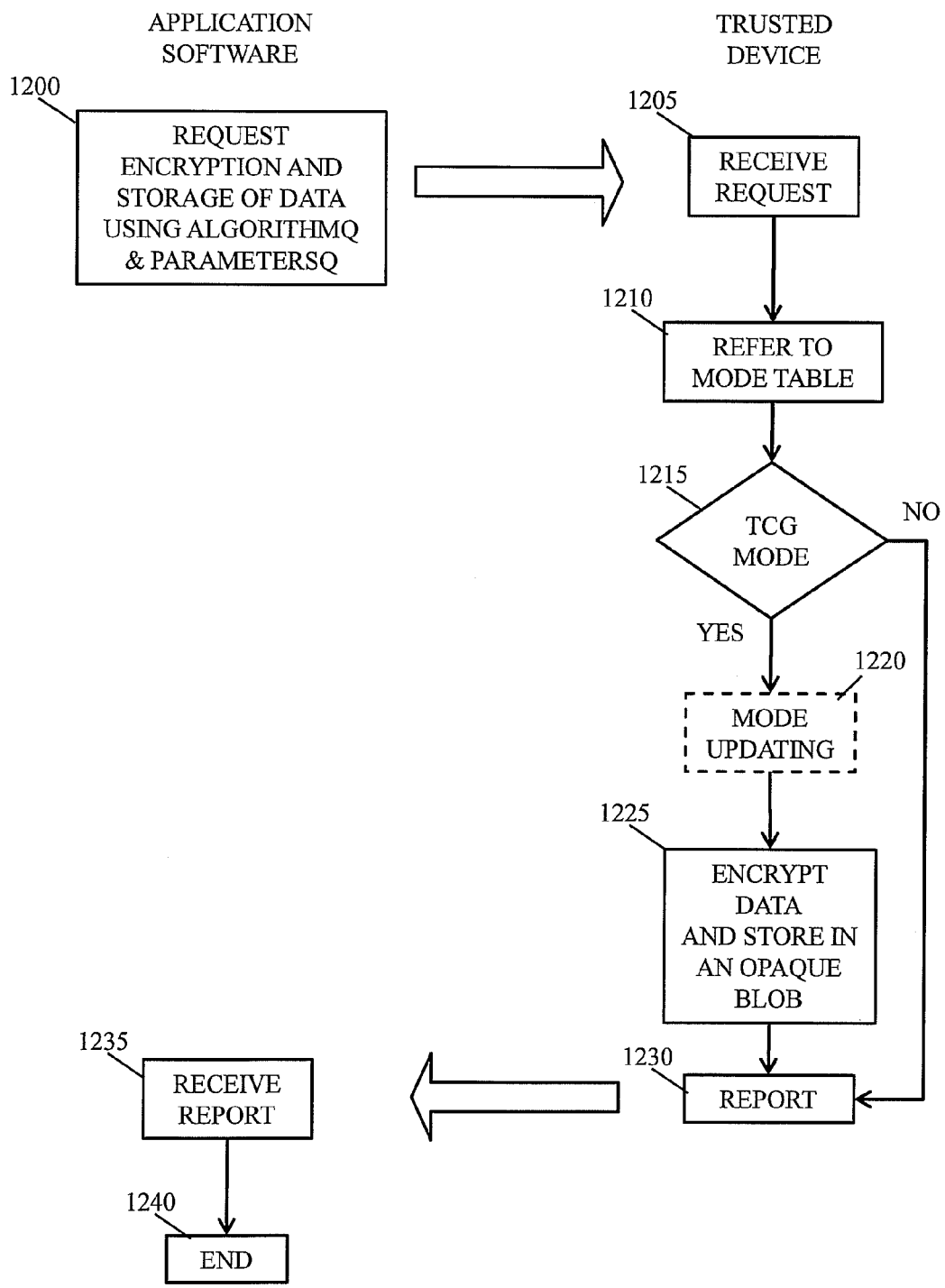
FIG. 12 is a flow diagram illustrating a process of performing a trusted operation with a trusted entity that is locked to operate only in a trusted mode of operation according to an embodiment of the present invention.

Once a trusted device is locked into a mode (or modes), its behaviour, according to an embodiment of the invention, may be illustrated by the flow diagram in FIG. 12. In this example, it is assumed that the trusted device has been locked so that it will only use TCG modes. In a first step [step 1200], an application issues a command requesting a trusted device 74 to encrypt data using an algorithmQ and associated parametersQ and store the data in an opaque blob. Next, the trusted device refers to the mode table 756 [step 1210] to establish that the algorithmQ and associated parametersQ are listed in some TCG mode. If [step 1215] the algorithmQ and associated parametersQ are listed in a TCG mode, then Mode Updating occurs [step 1220], as described with reference to step 910 in FIG. 9, the data is encrypted and stored in an opaque blob [step 1225], the success of the operation is reported to the application [step 1230], the application receives the report [step 1235] and the process ends [step 1240]. If, on the other hand [step 1215], the algorithmQ and associated parametersQ are not listed in the mode table 756 as a TCG mode, then the trusted device reports failure of the store operation to the application [step 1230], the application receives the report [step 1235] and the process ends [step 1240].

As illustrated, the mode table 756 shows two TCG modes (mode1 and mode2) and two non-TCG modes (mode3 and modeN). If the requested algorithm/parametersQ combination, resulting in nameQ, is listed in mode1 or mode2, according to this example, then the operation is successful. If, on the other hand, nameQ is not listed in mode1 or mode2, then the operation fails. The failure report would typically indicate that the cryptographic algorithm and parameter combination is not currently supported or usable by the trusted device. Of course, the application would be expected to deal with both success and failure scenarios, in a known way.

Figure 13:
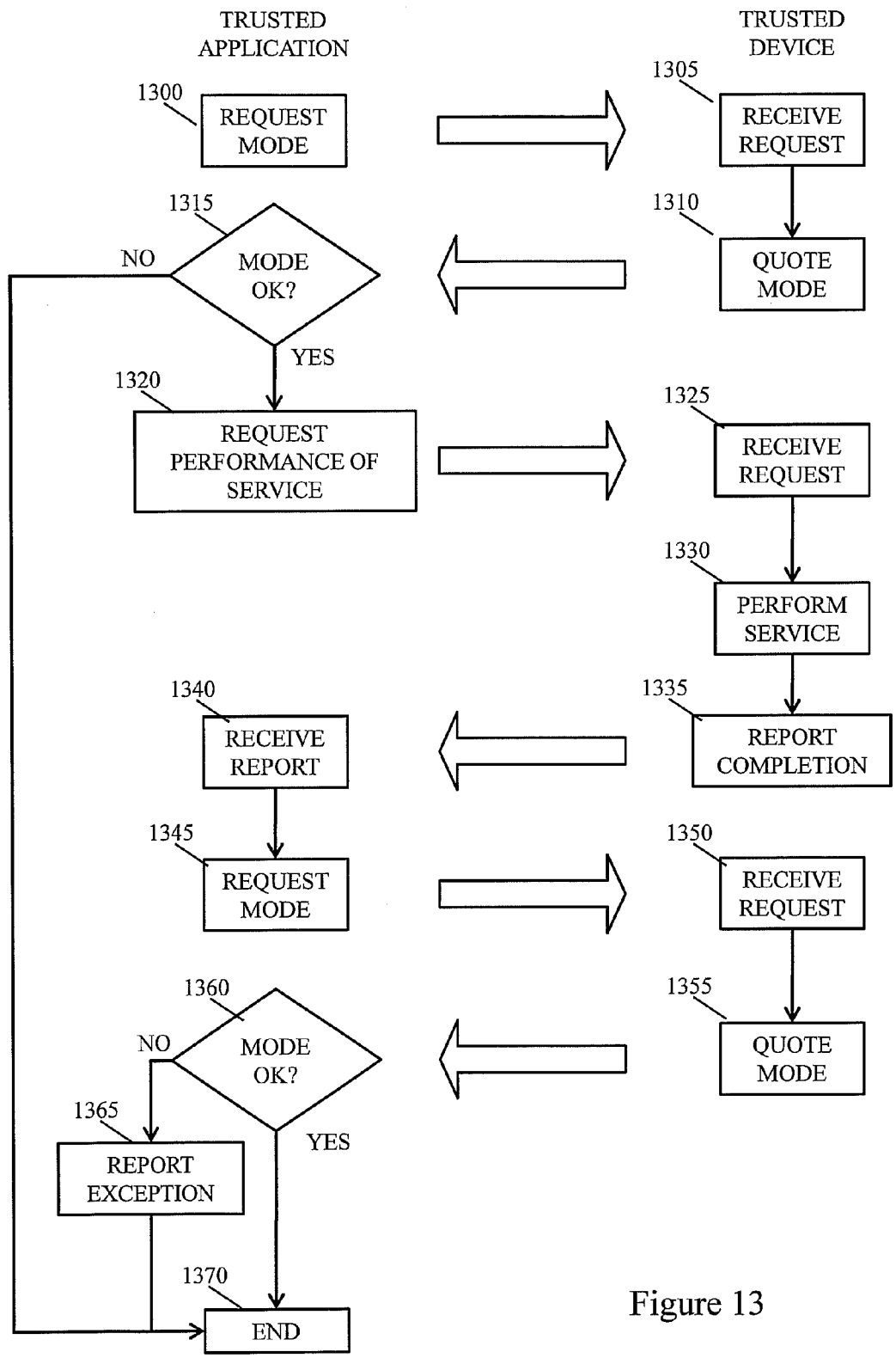
FIG. 13 is a flow diagram illustrating a process of checking the acceptability of the mode activity of a trusted device.

A further application of modes will now be described with reference to the flow diagram in FIG. 13, in which an application wishes to check that the mode activity of a trusted device is acceptable and remains so over the course of a requested service, during which time other requests may be enacted by the trusted device. In a first step [step 1300], the application issues a request, for example via a TPM Quote command, for the trusted device to report its current mode state. The trusted device receives the request [step 1305] and reports the mode to the application [step 1310]. The mode information reported back to the application can include any one or more of the mode, mode nonce 757, the TGC mode value 758 and/or the TCG mode nonce 759, for example, depending on the request and/or a security policy set by the owner of the trusted computing platform containing the trusted device. The application receives the mode information and determines [step 1315] whether it is acceptable; for example, the information may be acceptable if the trusted device has used only TCG modes since the start of a series of interactions that are part of the same high level operation. If not, the process ends [step 1370]. If the information is acceptable, the application requests the trusted device to perform a service, for example to reveal a password to be used to access a server [step 1320]. The trusted device receives the request [step 1325] and performs the service [step 1330]. Once the service has been performed, the trusted device reports completion [step 1335] and the application receives the report [step 1340]. At this stage, the application issues a further request for the trusted device to report its current mode state [step 1345]. The trusted device receives the request [step 1350] and reports the mode to the application [step 1355]. The mode information reported back to the application would comprise the same fields as was reported the first time [in step 1310]. The application receives the mode information and determines again whether it is acceptable [step 1360]. If the mode information is acceptable, then the process ends [step 1370]. If the information is not acceptable, for example the trusted device has during the performance of the service employed the use of unacceptable cryptographic algorithms (i.e. that are not listed in any of the acceptable modes), then the process reports an exception [step 1365]. The exception is reported to the owner of the application (which could be another application or a local or remote user) on the grounds that the integrity of the trusted device (or the platform containing the device, or another process using the device, or data stored or recovered by the device) may have been subverted during the operation of the service, by virtue of the use of unacceptable (i.e. unduly weak or compromised) cryptographic algorithms. The owner of the application would be expected to take appropriate steps (revoke the commitment of the operation, for example) and then the process then ends [step 1370].

The above embodiments are to be understood as illustrative examples of the invention. Further embodiments of the invention are envisaged. For example, a minimalistic embodiment of the invention may be used to verify that a trusted device provides only fixed default algorithms and parameters recommended by TCG, and provide a simple way for software to indicate that the trusted device should verify that requested algorithms and parameters are recommended by TCG. It is to be understood that any feature described in relation to any one embodiment may be used alone, or, if the context permits, in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computing platform comprising:
   a trusted entity including,
      a non-transitory memory that stores mode of operation information, the mode of operation information comprising:
         a mode list table that identifies a set of operating modes, a first operating mode of the set of operating modes comprising a mode name and characteristics of cryptographic algorithms, wherein the characteristics of each of the cryptographic algorithms comprise: the cryptographic algorithm, parameters associated with the cryptographic algorithm; and a name of the cryptographic algorithm, the name of the cryptographic algorithm including a statistically unique identifier based on the parameters associated with the cryptographic algorithm, wherein the mode name includes a second statistically unique identifier cryptographically derived from characteristics of the first operating mode; and
      a hardware controller that:
         receives a request including a desired operating mode, a desired cryptographic algorithm, and desired parameters associated with the desired cryptographic algorithm;
         compares the desired operating mode, the desired cryptographic algorithm, and the desired parameters associated with the desired cryptographic algorithm, with the algorithms and parameters associated with the names of the cryptographic algorithms in the mode list table;
         determines, in response to the comparison, whether the desired operating mode, desired cryptographic algorithm, and desired parameters associated with the desired cryptographic algorithm, are listed in the mode list table; and
         responsive to a determination that the desired operating mode, desired cryptographic algorithm, and desired parameters associated with the desired cryptographic algorithm, are listed in the mode list table, implements cryptographic operations using the desired cryptographic algorithm.

2. The computing platform of claim 1, wherein the mode of operation information further comprises:
   a trusted mode value;
   a trusted mode change indicator value,
   wherein the mode list table further comprises an individual trusted mode flag associated with each operating mode of the set of operating modes, the trusted mode flag indicating whether the associated operating mode is recommended by a trusted party; and
   wherein the hardware controller:
      determines whether the desired operating mode is recommended by the trusted party based on the trusted mode flag listed in the mode list table for the desired operating mode;
      in response to a determination that the desired operating mode is recommended by the trusted party, sets the trusted mode value to indicate that the desired operating mode is recommended by the trusted party; and sets the trusted mode change indicator value to a random value generated responsive to the trusted mode value changing.

3. The computing platform of claim 1, wherein the trusted entity stores data resulting from the cryptographic operation and seals the stored data based upon mode of operation information.

4. The computing platform of claim 3, wherein the trusted entity either releases or use the stored data in response to a determination that a new operating mode is compatible with the mode of operation information based upon which the stored data was sealed.

5. The computing platform of claim 4, wherein the new operating mode is determined to be compatible responsive to a determination that the new operating mode comprises at least one of the following characteristics:

is a trusted mode of operation;

has not changed since the data was stored; or has not been un-trusted in a current boot cycle of the computer platform.

6. The computing platform of claim 1, wherein the hardware controller reports the desired operating mode.

7. The computing platform of claim 1, wherein the trusted entity permits locking, by an authenticated party of the trusted entity, operation of the trusted entity into trusted modes of operation, wherein the trusted modes of operation comprise modes recommended and defined by the trusted party.

8. The computing platform of claim 1, wherein the mode of operation information further comprises:

a current mode register that stores a current operating mode of the trusted entity; and a mode change indicator value; and wherein the hardware controller further:

determines whether the desired operating mode is stored in the current mode register in response to a determination that the desired operating mode is in the mode list table; and stores the desired operating mode in the current mode register and sets the mode change indicator value to a random value in response to a determination that the desired operating mode is not stored in the current mode register.

9. A hardware trusted component comprising:

a non-transitory memory that stores mode of operation information, comprising:

a mode list table that identifies a set of operating modes, a first operating mode of the set of operating modes comprising a mode name and characteristics of cryptographic algorithms, wherein the characteristics of each of the cryptographic algorithms comprise: the cryptographic algorithm, parameters associated with the cryptographic algorithm; and a name of the cryptographic algorithm, the name of the cryptographic algorithm including a statistically unique identifier based on the parameters associated with the cryptographic algorithm, wherein the mode name includes a second statistically unique identifier cryptographically derived from characteristics of the first operating mode; and a hardware controller that:

receives a request including a desired operating mode, the desired operating mode including a desired cryptographic algorithm, and desired parameters associated with the desired cryptographic algorithm;

compares the desired operating mode, the desired cryptographic algorithm, and the desired parameters associated with the desired cryptographic algorithm, with the algorithms and parameters associated with the names of the cryptographic algorithms in the mode list table;

determines, in response to the comparison, whether the desired operating mode, desired cryptographic algorithm, and desired parameters associated with the desired cryptographic algorithm, are listed in the mode list table; and responsive to a determination that the desired operating mode, desired cryptographic algorithm, and desired parameters associated with the desired cryptographic algorithm, are listed in the mode list table, implements cryptographic operations using the desired cryptographic algorithm.

10. The hardware trusted component of claim 9, wherein the mode of operation information further comprises:

a current mode register that stores a current operating mode of the trusted entity; and a mode change indicator value; and wherein the hardware controller further:

determines whether the desired operating mode is stored in the current mode register in response to a determination that the desired operating mode is in the mode list table; and stores the desired operating mode in the current mode register and set the mode change indicator value to a random value in response to a determination that the desired operating mode is not stored in the current mode register.

11. A non-transitory computer readable storage medium comprising instructions recorded thereon that, when executed by a processor, perform cryptographic operations and cause the processor to:

store in a memory, mode of operation information comprising:

a mode list table that identifies a set of operating modes, a first operating mode of the set of operating modes comprising a mode name and characteristics of cryptographic algorithms, wherein the characteristics of each of the cryptographic algorithms comprise: the cryptographic algorithm, parameters associated with the cryptographic algorithm; and a name of the cryptographic algorithm, the name of the cryptographic algorithm including a statistically unique identifier based on the parameters associated with the cryptographic algorithm, wherein the mode name includes a second statistically unique identifier cryptographically derived from characteristics of the first operating mode;

receive a request for a desired operating mode, the desired operating mode including a mode name, a cryptographic algorithm, and parameters associated with the desired cryptographic algorithm;

compare the desired operating mode, the desired cryptographic algorithm, and the desired parameters associated with the desired cryptographic algorithm, with the algorithms and parameters associated with the names of the cryptographic algorithms in the mode list table;

determine, responsive to the comparison, whether the desired operating mode, desired cryptographic algorithm, and desired parameters associated with the desired cryptographic algorithm, are listed in the mode list table; and responsive to a determination that the desired operating mode, desired cryptographic algorithm, and desired parameters associated with the desired cryptographic algorithm, are listed in the mode list table, implements cryptographic operations using the desired cryptographic algorithm.

12. The non-transitory computer readable storage medium of claim 11,
wherein the cryptographic operations are performed within a trusted entity and the mode of operation information further comprises:
a trusted mode value;
a trusted mode change indicator value, and
the mode list table further comprises a trusted mode flag associated with each of the at least one operating mode, the trusted mode flag indicating whether the associated operating mode is recommended by a trusted party; and
wherein the instructions are further to cause the processor to:
determine whether the desired operating mode is recommended by a trusted party based on the trusted mode flag corresponding to the desired operating mode in the mode list table;
in response to a determination that the desired operating mode is recommended by a trusted party, set the trusted mode value to indicate that the desired operating mode is recommended by a trusted party; and
set the trusted mode change indicator value to a random value generated each time the trusted mode value changes.

13. The non-transitory computer readable storage medium of claim 11, wherein the mode of operation information further comprises:
a current mode register that stores a current operating mode of the trusted entity; and
a mode change indicator value; and
the instructions are to further cause the processor to:
determine whether the desired operating mode is stored in the current mode register in response to a determination that the desired operating mode is in the mode list table; and
store the desired operating mode in the current mode register and set the mode change indicator value to a random value in response to a determination that the desired operating mode is not stored in the current mode register.

14. A method of operating a computing platform incorporating a trusted entity, the method comprising:
storing in a memory, mode of operation information comprising:
a mode list table that identifies a set of operating modes, a first operating mode of the set of operating modes comprising a mode name and characteristics of cryptographic algorithms, wherein the characteristics of each of the cryptographic algorithms comprise: the cryptographic algorithm, parameters associated with the cryptographic algorithm; and a name of the cryptographic algorithm, the name of the cryptographic algorithm including a statistically unique identifier based on the parameters associated with the cryptographic algorithm, wherein the mode name includes a second statistically unique identifier cryptographically derived from characteristics of the first operating mode;
receiving, by a hardware controller, a request including a desired operating mode, a desired cryptographic algorithm, and desired parameters associated with the desired cryptographic algorithm;
comparing the desired operating mode, the desired cryptographic algorithm, and the desired parameters associated with the desired cryptographic algorithm, with the algorithms and parameters associated with the names of the cryptographic algorithms in the mode list table;
determining, responsive to the comparing, whether the desired operating mode, desired cryptographic algorithm, and desired parameters associated with the desired cryptographic algorithm, are listed in the mode list table; and
responsive to a determination that the desired operating mode, desired cryptographic algorithm, and desired parameters associated with the desired cryptographic algorithm, are listed in the mode list table, implementing cryptographic operations using the desired cryptographic algorithm.

15. The method of claim 14, wherein the mode of operation information further comprises:
a trusted mode value;
a trusted mode change indicator value,
wherein the mode list table further comprises an individual trusted mode flag associated with each operating mode of the set of operating modes, the trusted mode flag indicating whether the associated operating mode is recommended by a trusted party; and
the method further comprising:
determining whether the desired operating mode is recommended by the trusted party based on the trusted mode flag listed in the mode list table for the desired operating mode;
setting, in response to a determination that the desired operating mode is recommended by the trusted party, the trusted mode value to indicate that the desired operating mode is recommended by the trusted party; and
setting the trusted mode change indicator value to a random value responsive to the trusted mode value changing.

16. The method of claim 14, wherein the mode of operation information further comprises:
a current mode register that stores a current operating mode of the trusted entity; and
a mode change indicator value; and
wherein the method further comprises:
determining whether the desired operating mode is stored in the current mode register in response to determining that the desired operating mode is in the mode list table; and
storing the desired operating mode in the current mode register and setting the mode change indicator value to a random value in response to determining that the desired operating mode is not stored in the current mode register.

* * * * *

UNITED STATES PATENT AND TRADEMARK OFFICE
CERTIFICATE OF CORRECTION

Page 1 of 1

PATENT NO. : 9,026,803 B2
APPLICATION NO. : 12/627500
DATED : May 5, 2015
INVENTOR(S) : Valiuddin Y. Ali et al.

It is certified that error appears in the above-identified patent and that said Letters Patent is hereby corrected as shown below:

In the Drawings

In sheet 6 of 10, reference numeral 900, line 4, delete "PARMTERS" and insert -- PARAMETERS --, therefor.

In the Specification

In column 4, line 39, delete ":" and insert -- . --, therefor.

In column 9, line 37, delete ")" and insert -- . --, therefor.

In the Claims

In column 21, line 12 approx., in Claim 4, delete "use" and insert -- uses --, therefor.

Signed and Sealed this
Twenty-third Day of February, 2016

Michelle K. Lee
*Director of the United States Patent and Trademark Office*